United States Patent
Keuerleber et al.

[15] 3,706,515
[45] Dec. 19, 1972

[54] DEVICE FOR FEEDING FLOWABLE MATERIAL TO A MOLD CAVITY

[72] Inventors: Rudi Keuerleber, Esslingen; Fritz-Wilhelm Pahl, Delbruck, both of Germany

[73] Assignee: Krauss-Maffei Aktiengesellschaft, Munich, Germany

[22] Filed: Feb. 16, 1971

[21] Appl. No.: 115,205

[30] Foreign Application Priority Data

Feb. 20, 1970 Germany............P 20 07 935.0

[52] U.S. Cl. ...................425/4, 425/252, 425/257
[51] Int. Cl. .............................................B29d 27/04
[58] Field of Search..........425/4, 252, 257, 410, 447

[56] References Cited

UNITED STATES PATENTS 2,885,268  5/1959  Breer et al..........................425/4 X
861,903   7/1907  Rosell..................................425/257
3,099,045  7/1963  Honkanen......................425/252 X
2,850,990  9/1958  Rasmusson....................425/257 X

*Primary Examiner*—H. A. Kilby, Jr.
*Attorney*—Karl F. Ross

[57] ABSTRACT

A device for feeding flowable materials, e.g., a mixture of inter-reactive components, into a mold cavity, has a mixing chamber opening directly into the mold cavity without constriction and a pair of inlets connected to respective supply lines for the components. A control member or plunger is provided in the reaction chamber to close its outlet flush with a mold surface and is provided with grooves in a closed condition of the slider which create recirculation paths for the components when they are not fed to the mixing chamber.

9 Claims, 4 Drawing Figures

PATENTED DEC 19 1972

Rudi Keuerleber
Fritz-Wilhelm Pahl
INVENTORS.

BY
Karl F. Ross
Attorney

DEVICE FOR FEEDING FLOWABLE MATERIAL TO A MOLD CAVITY

FIELD OF THE INVENTION

Our present invention relates to devices for feeding flowable materials to mold cavities and, more particularly, to a device for mixing at least two reactive components and feeding the mixture to a mold cavity.

BACKGROUND OF THE INVENTION

With the increasing use of synthetic-resin materials, the provision of devices for feeding such materials into mold cavities have gained attention. For example, it is known to introduce into a mold cavity a single polymerizable or hardenable component, this being carried out with ease by connecting the source of the material under pressure with the mold cavity and placing a valve in the supply line to control the introduction of the material.

Difficulties are, however, encountered when two-part synthetic resins generally have a catalyst component and a monomeric component, two or more copolymerizable components, an inactive resin and an activator for the resin etc. In each case, the two components must be intimately mixed so that a uniform reaction occurs in the mold cavity, but must be kept separate until the mixing is desired. For example, in the urethane-resin field it is known to react a polyhydric alcohol (polyol) with a di- or polyisocyanate and obtain a highly elastic product commonly identified as a polyurethane. In general, activators or catalysts are also provided. It is equally well known to include in one or both of the components, or their mixture, a foaming or blowing agent capable of expanding the polymerizing resin to form cells or pores therein. Expanding agents suitable for this purpose include those which are normally liquid but volatilize at the mold temperature, those which are gaseous and are held under pressure until the material is introduced into the mold, those which are released by chemical action during the mixing stage and thereafter, etc.

It will be apparent that the problem of designing a system for both mixing the components and introducing them into a mold is complicated by the presence of a foaming, expanding or blowing agent, by the reactive nature of the two components and, frequently, by the need to provide separate supply ducts for additional substances such as the catalyst emulsifying agents, stabilizers and the like. For example, three components are involved in the polymerization of caprolactam (first component) with an isocyanate activator (second component) in the presence of a catalyst (third component). In some systems as many as six components must be mixed simultaneously, as and before the mixture is introduced into the mold.

In one conventional arrangement, the several components are connected to a mixing chamber opening into the mold chamber or cavity by respective supply lines having metering pumps for feeding the individual components into the mixing chamber. Between each pump and the respective inlet of the mixing chamber, a valve is provided which may cut off the supply of the particular component to the mold cavity and shunt the flowing stream to the intake side of the pump, thereby maintaining a circulation until the valve is switched again to permit communication between the supply line and the mixing chamber. This system has the significant disadvantage that the valves must be highly synchronized so that the two components are fed in the desired proportions and rates to the mixing chamber. It will be apparent that any excess of either component may cause deterioration of the product and may even prevent the formation thereof. To facilitate control, such valves have generally been mere cutoff valves (as opposed to throttle valves), the controlled feed of the material being effected by the metering pumps.

It was also found practical in the past, though highly expensive, to provide cutoff valves which are fluid-activated. This system had the disadvantage that, aside from the expense, it was difficult to maintain a constancy of behavior of the valves and the fluid control system over long periods and, consequently, it was relatively difficult to adjust the respective valves for precise synchronized operation. Even during a mold-filling period, such systems have been found to alter and introduce variations in the quantities of the respective component fed to the mold.

OBJECTS OF THE INVENTION

It is the principal object of our present invention to provide an improved device or system for feeding two or more flowable components to a mold cavity which obviates the afore-mentioned disadvantages.

It is another object of our invention to provide a valve and control system for introducing two or more interactive components to a mold cavity.

Another object of our present invention is to provide an improved device for the introduction of two-component reactive synthetic resin mixtures into a mold cavity in such manner as to increase the quality of the product produced thereby and reduce its cost and the cost of the equipment.

Yet a further object of the invention is to provide an improved system for controlling mixing of two or more reactive components in the presence of a blowing agent, expanding agent or foaming agent.

SUMMARY OF THE INVENTION

These objects and others which will become apparent hereinafter are attained, in accordance with the present invention, in a mixing and valve arrangement which comprises a housing formed with a mixing chamber opening directly into the mold cavity, i.e., communicating with the mold without change of cross-section or any constriction of the flow therethrough, the chamber being generally elongated; at least two inlet ports are provided for communication between respective feed lines for the interreactive components laterally of the chamber while a control plunger or slide is shiftable in the chamber between a position in which the slide obstructs the inlet ports and thereby blocks communication between them and the mixing chamber, and a position in which unobstructed flow of the mixture to the mold is permitted.

According to a specific feature of the invention, a single slide is provided for controlling the flow of the components for the respective inlet ports into the chamber and is operable independently of the pressure at the inlet ports, the latter being connected to respective metering pumps which supply the components to the mixing chamber.

The mixing chamber of the invention is preferably of a uniform cross section, at least in the stretch between the inlet ports and the discharge port, while the plunger or slider has a cross section corresponding to that of the mixing chamber and is designed to sweep this stretch clean of any residuals upon shifting of the slide from an unblocking position into its blocking position.

In its blocking position, the slide defines with the inlet ports recirculating path for the reactive components. In all positions of the slide, therefore, the channels and flow cross sections traversed by the reactive components may be dimensioned to prevent undesired release of any blowing medium or expanding agent incorporated therein. At least the end of the slide turned toward the mold cavity has an area and configuration corresponding to the cross section of the mixing chamber and adapted to lie flush with the outlet thereof to define part of the mold-cavity wall in the region at which the mixing chamber communicates with the mold cavity. The length of the slide should at least correspond to the length of the aforementioned stretch and the slide stroke may be equal to the length of this stretch, thereby further insuring the self-cleaning action. Furthermore, the mixing chamber and control-slide assembly may be replaceably mounted on the mold or may be replaceably connected thereto so that the mixing chamber may be exchanged for another of different dimensions.

According to still another feature of this invention, the control slide may be provided with a longitudinally extending (axial) bore in which an independently displaceable plunger is received, thereby permitting independent operation of the valve member and the member driving the reactive mass in the mixing chamber into the mold cavity. The control slide may, in this case, be formed with radially outwardly converging apertures, preferably of a conical configuration which communicate in the unblocking position of the slide with the inlet port but are alignable with a source of clearing fluid pressure in the blocking position of the slide. In the latter position, in which the conically converging transverse bores register with ports connected to a source of air under pressure, the compressed air is designed to drive excess material from the ports in a "blow-out" cleaning thereof. This construction has the further advantage that the control movement of the slide into the blocking position is accelerated because the reactive mass is developed within the side and is carried from the latter into the mold cavity so that elevated hydraulic-type pressure is not applied axially upon the slide to resist its displacement into the unblocking position. The cross section of the space in which the mixture of the reactive components if formed, i.e., the bore of the slide, is preferably dimensioned to have a flow cross section corresponding to the flow across sections of the overflow channels and grooves through which the reactive components are lead along their recycling path in the blocking position of the slide.

The inwardly conically divergent bores, which extend transversely to the longitudinal or axial bore mentioned earlier, increase the cross section over which the two reactive streams are trained upon one another and insure a better mixing than is otherwise possible. This is especially the case when the inlet ports are provided with atomizing devices capable of breaking up the reactive-component streams. Such atomizing devices or nozzles may include means upstream of each inlet port for imparting rotation to the stream. Such means may include screw-type grooves or ribs, e.g., worms, for imparting same-sense rotations to the streams.

According to still another feature of this invention, the atomizing nozzles may be constituted with cylindrical sleeves having frustoconically converging recesses opening at the inlet ports into the mixing chamber and receiving conically convergent central bodies, e.g., carrying the rotation-producing means, to define conical annuluses through which the reactive components are forced. The central body may be provided with means for adjusting its position axially to set the flow cross section of the annulus or its width in accordance with the pressure of the individual synthetic-resin component and the working cycle.

We have further found it to be advantageous to provide between the region of the inlet ports and the outlet, i.e., along the stretch swept by the plunger, and preferably immediately proximal to the inlet ports, a transversely shiftable stopper pin adapted to obstruct or constrict the longitudinal bore. The latter sections to control the foaming of the mixture and the mixing pressure such that the optimum pore structure and appearance of the molded body can be established experimentally and then maintained during production.

We have already pointed out that it is desirable, especially when the body to be produced in the mold cavity is to have a smooth surface, to provide the end of the plunger or slide or both with a smooth face adapted to lie flush with the end of the mixing chamber and with a wall of the mold cavity. To this end the mixing chamber preferably extends into the mold body and has an extremity whose face lies flush with the wall of the mold cavity. Since the plunger and/or control slot also lies flush with this face in its blocking extreme position, no synthetic resin can remain within the mixing chamber and wastage of material is reduced while a smooth surface body is produced; in addition, steps hitherto required for removing projecting portions of the synthetic resin material as has been necessary with systems in which a column of such material remain in the resin-injecting nozzle, are eliminated.

DESCRIPTION OF THE DRAWING

The above and other objects, features and advantages of the present invention will become more readily apparent from the following description reference being made to the accompanying drawing in which.

SPECIFIC DESCRIPTION

Figure 1:
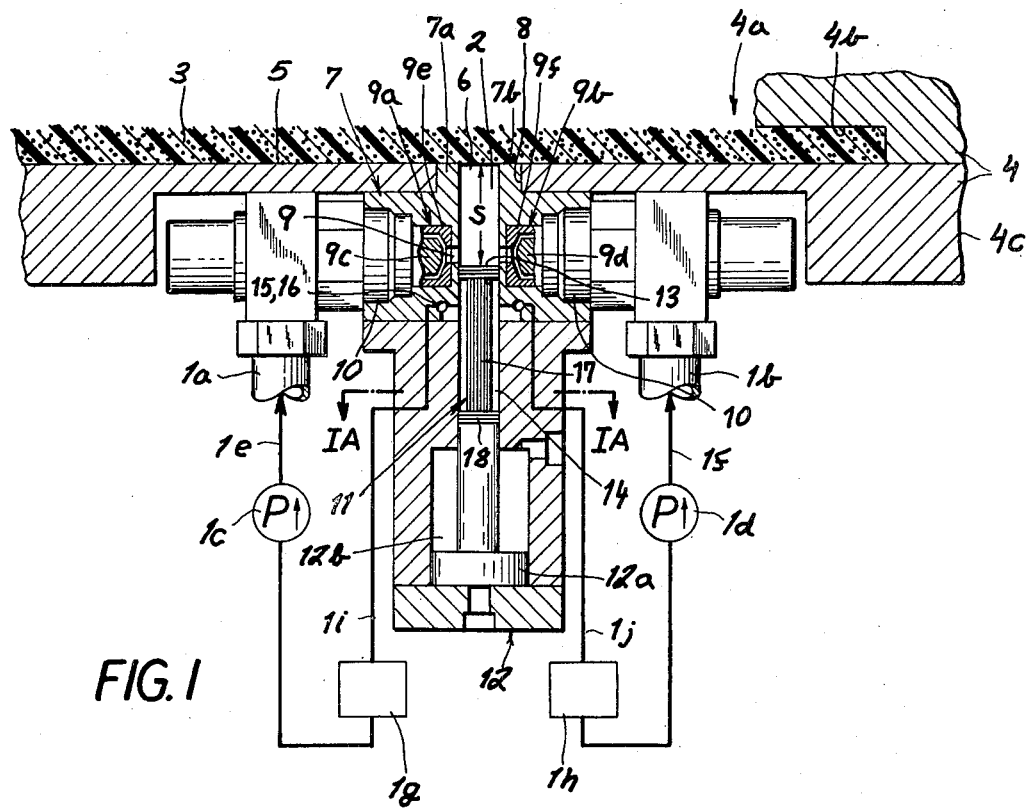
FIG. 1 is an axial cross-sectional view of a portion of a mold provided with the device according to the present invention.
Figure 1A:
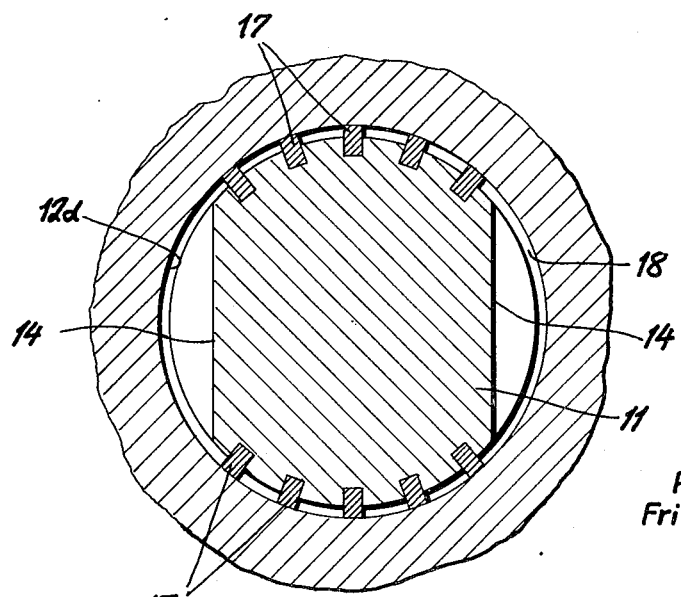
FIG. 1A is a cross section taken along the line IA — IA of FIG. 1.

In FIGS. 1 and 1A, we show a device for molding foamed synthetic resin bodies 3 in a two-part mold generally shown at 4 defining a mold cavity 4a having an edge zone 4b into which the synthetic resin mixture is adapted to penetrate. The mold plate 4c is provided with an opening 8 into which the tubular nose 7a of a mixing chamber 7 is adapted to project so that the end surface 7b of this mixing chamber lies precisely flush with the mold surface or wall 5 at the outlet 6 of the mixing chamber.

Two reactive components are supplied to the mixing chamber via feed conduits 1a and 1b, respectively, connected to metering pumps 1c and 1d of the respective feed circuits 1e and 1f. Reservoirs 1g and 1h may be provided in the recirculating paths which can have return lines 1i and 1j respectively.

Inlet ports 9 open radially inwardly the diametrically opposite sides into the mixing chamber 2, here formed as a cylindrical bore of uniform (constant) cross section over the stretch S between the inlet ports and the surface 5. The inlet ports 9 may be formed by nozzles 9a and 9b fitted into the housing 7 and provided with central bodies 9c and 9d received within sleeves 9e and 9f as described, for example, in connection with FIG. 2.

The two reactive components are designed to mix intimately and to react (polymerize) in the presence of a foaming agent which can be incorporated in one or both of the components so that the mixture hardens upon introduction into the mold into a cellular body 3 with a relatively massive edge zone (as formed at 4b) and a porous interior, the body conforming accurately to the contours of the mold.

While the mixing chamber has been shown to be cylindrical in FIG. 1, it may also be prismatic (FIG. 2) provided, as indicated earlier, the outlet 6 lies flush with the surface 5 and the mixing chamber 2 opens into the mold cavity directly, i.e., without constriction. The remainder of an atomizing device 10 is illustrated diagrammatically for each of the inlet ports and may correspond to the structure represented at 23, 24 etc. of FIG. 2.

Within the mixing chamber 2, a control slide 11 is provided which is shiftable along the mixing-chamber axis with a stroke at least equal to S, this slide being connected with a piston 12a reciprocable in a cylinder 12b of the fluid-responsive slider control unit 12 which may be operated with hydraulic or pneumatic pressure. The end face 13 of the slide 11 is adapted to lie flush with the surface 5 in the blocking position of the slide. The slider 11, moreover, interrupts the flow from inlet ports 9 into the mixing chamber 2 at the end of the filling of the mold and simultaneously forces the mixture within the chamber 2 into the mold in the manner of a plunger.

As further illustrated in FIG. 1, the mixing chamber 2 is constituted as a plunger bore while the slide 11 is generally cylindrical (FIG. 1A) so that, in the flush position of the surface 13, a perfectly smooth face is formed on the body 3. Along the generatrices of the slider 11 in registry with the inlet ports 9, we provide a pair of axially extending grooves 14 constituting recirculation or overflow channels which communicate with ducts 15 and 16 disposed in spaced relation to these ports but on the side thereof opposite the outlet 6.

Hence, in the blocking position of the slide, a recirculation path is established from the inlet ports, through the grooves 14 and the ducts 15, 16 to return to the respective pumps 1c and 1d. The return or recirculating ducts or channels are dimensioned to have a cross section equal to the flow across section of the mixing chamber 2 to prevent undue expansion of the individual components when they are diverted along their recirculating paths. To prevent leakage of the components from one inlet port 9 to the other in the blocking position of the slider, the latter is provided with a plurality of longitudinally extending parallel sealing ribs 17 flanked on each end by circumferential sealing ribs 18 (see FIG. 1A).

In the position of the slider illustrated in FIG. 1, the two components are directed transversely to the axis of the chamber 2 and at one another so that a complete and thorough mixing of the two components is effected with the chamber 2 as the mixture is fed to the mold 4 in which the synthetic resin reacts, foams and hardens to produce the cellular body. During approximately the last 2-5 minutes of the closed-mold portion of the cycle, the flow from the ports 9 into the mixing chamber 2 is interrupted by the slide 11 although the components continuously recirculate without expansion to the suction side of the component pumps. During the closing movement of the plunger 11, the residual mixture in the chamber 2 is forced into the mold cavity. After hardening of the material in the mold and, generally, opening of the latter, the plunger 11 is withdrawn.

Within the mixing chamber 2, the components flow in countercurrent and are intimately mixed. The forward movement of the plunger, of course, results in a purging of the chamber 2 of all residues of the mixture.

The system illustrated in the drawing has been found to be particularly suitable with two-component polymer systems in which one component includes one monomer and the other component a monomer adapted to copolymerize therewith. Each or both components may include the blowing agent. As a specific example, one component may consist of a hundred parts by weight of a polyol and 0 to 20 parts by weight of a blowing agent, e.g., a fluorochlorohydrocarbon of the freon type, 0 to 5 parts by weight of activators, emulsifiers and stabilizers of the type conventionally used in the formation of foamed polyurethane resins. The polyisocyanate (120 to 160 parts by weight), together with the remainder of the blowing agent (to a total of 20 parts by weight) constitutes a second component When the first component contains up to 10 parts by weight of the blowing agent, therefore, the second component up to 10 parts by weight thereof as well. Either or both of the components may contain nonreactive and filler materials such as glass fiber, pigments and extendors. Of course, a third inlet port 9 may be provided and the three ports will then open in the same transverse plane in the direction of the axis of the mixing chamber and will preferably be angularly equispaced about the latter. A three-port system has been found to be effective for caprolactam polymers in which case a first component may be 100 parts of caprolactum, the second component 0.6 to 5 parts of the catalyst and the third component several parts of an activator such as an isocyanate.

Figure 2:
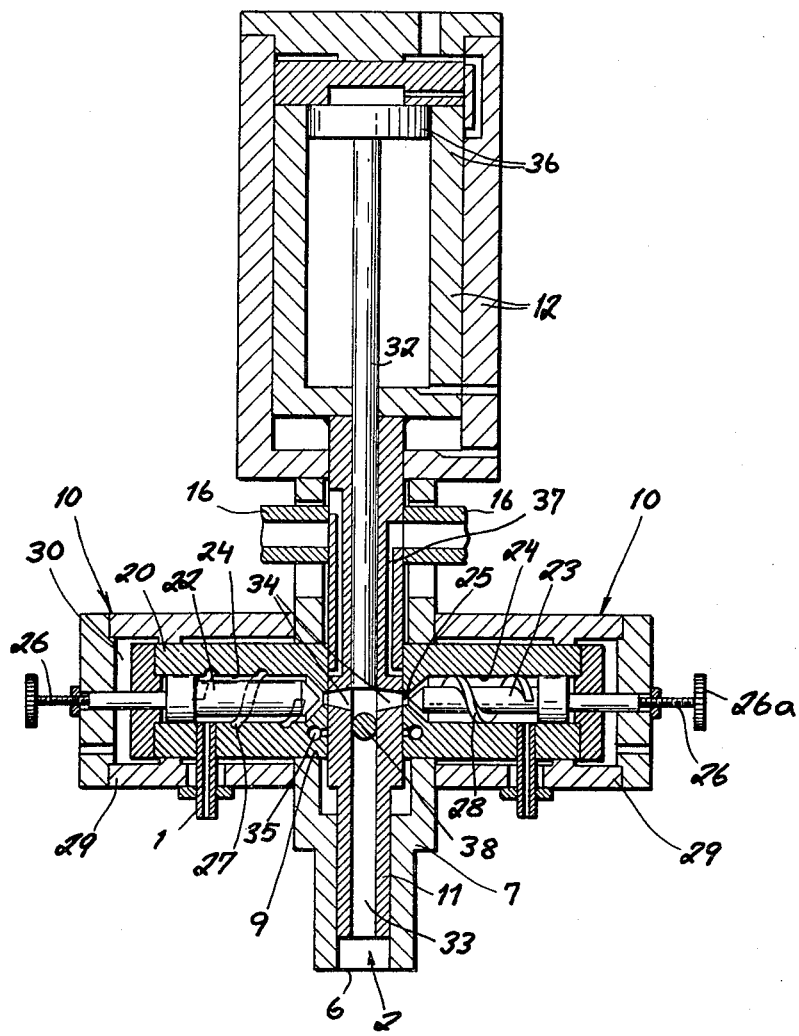
FIG. 2 is an axial cross section through a device according to another embodiment of the present invention.

In FIG. 2, we show another system in which numerals corresponding to those of FIG. 1 represent similarly functioning parts. The individual inlet ports 9 of the mixing chamber 2 are here so dimensioned that the individual atomizing devices 10 extend into these ports. Each atomizing device 10 comprises a sleeve 20 or 21 receiving a cylindrical insert 22 or 23 whereby, between each sleeve 20 or 21 and the respective central body 22 or 23, an annular space or annulus 24 is provided. At the outlet end of each of the atomizing nozzles, the sleeve 20 or 21 is funnel shaped or frustoconically convergent to the diameter of the atomizing outlet. Similarly, the central bodies 22 and 23 conically converge to points and are generally complementary to the frustoconical outlets of the sleeves 20 and 21. Adjusting devices, e.g., threaded spindles 26 having milled heads 26a for manual displacement, or conventional hydraulic devices not further illustrated, can shift the central bodies 22 or 23 relative to the sleeves 20 or 21, axially to increase or reduce the flow cross section of the conical portion of the annular gap 24 in a stepless manner. Thus the atomizing pressure of each synthetic resin component, in accordance with its indidual viscosity or the degree of dispersion, can be set precisely independently of the position of the slide 11. The central bodies 22 or 23 are so arranged and constructed that the opening of the conical portion of annular gap 24 is about 0.4 mm in the filling position of the control slide 11 but up to 10 mm in the blocking position of this control slide. Consequently, a hydraulic device in which the bodies 22 and 23 are coupled with the cylinder 12 controlling the slide 11 is desirable.

As is also apparent from FIG. 2, the diametrically opposite atomizing devices 10 are provided with screwlike guide members to impart a rotation to the respective components as they are forced into the mixing chamber. These screw-type formations may be screw-type grooves as illustrated at 27, formed in the inner wall of the sleeve 20, or screw-type ribs 28 as shown upon the central body 24 at the right-hand side of FIG. 2. The atomizing devices 10 are received in respective fluid cylinders 29 which produce hydraulic pressure cushions 30 which bias the members 20 and 21 directly against the slide 11. In this embodiment, the engaging surfaces of the slide 11 and the sleeves 20 and 21 are planar to insure an effective seal. This arrangement has the advantage that the pressure of the sleeves 20 and 21 against the slide 11 can be relieved upon closing of slide 11, thereby permitting the closing movement to be rapid. On the other hand, the high pressure required for effective sealing in the mold-filling condition can also be obtained. Moreover, during the closing movement of the slider 11, the relaxation of the sealing pressure reduces the tendency of the surface of the slider to wear.

We may observe that a planar sealing surface has some important advantages, especially when, for example, four components are to be supplied individually to the mixing chamber. In this case, the slide 11 may be prismatic or, for example, square cross section. With six components, each with the respective atomizing nozzle, a six-sided (hexagonal) slider is used.

The slider 11 is provided with an axially extending bore 33 in which a plunger 32 is axially shiftable. A pair of inwardly frustoconically divergent transfer ports 34 open into the bore 33 and, in the filling position of the slide 11, register with the atomizing devices 10. In the blocking position of the slide 11, however, these ports register with blowout ducts 35. To actuate the plunger 32, we provide a further piston-and-cylinder arrangement 36 which is coaxially received within the piston-and-cylinder arrangement 12 for actuating the control slide.

Figure 3:
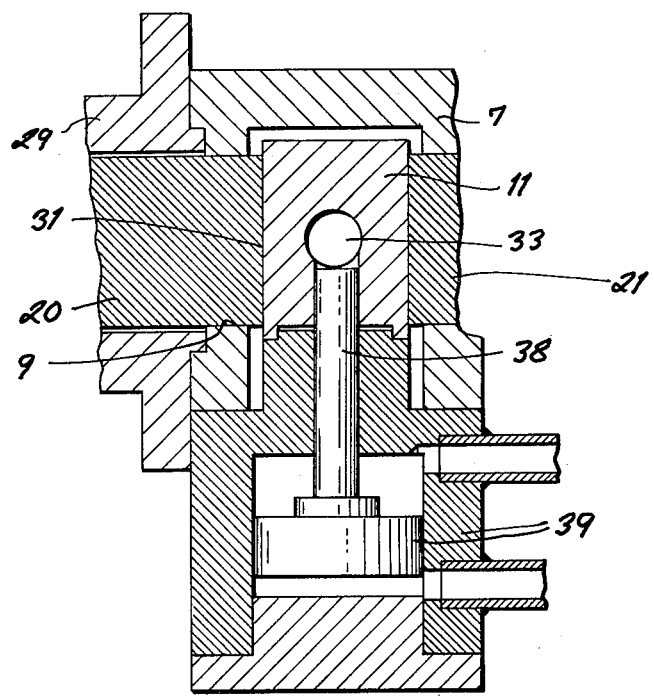
FIG. 3 is a detail view of a portion of the device of FIG. 2 in transverse cross section.

At the end of the mixing and mold-filling stage, therefore, the slide 11 can be shifted as described in connection with FIG. 1 to bring the atomizing nozzles 25 into communication with bypass channels 37 and return line 16 of the component-circulation systems. Simultaneously, the transverse ports 34 communicate with the blowout ducts 35. The individual components, of course, circulate freely and independently. One of the blowout ducts 35 communicates with the compressed air source while the other opens freely in the atmosphere. Any residue of the components or their mixture is blasted out of the ports and out of the housing. Subsequently, the plunger 32 advances to the outlet 6 as does the slide 11 so that the housing 7, the slide 11 and the plunger 32 all lie flush with the mold face as described earlier. The plunger 32 can then be retracted and, once the slide 11 is drawn away from the mold to permit ports 34 to register with the inlets 25 from the atomizing nozzle, the mixing and filling portion of the cycle is repeated. As illustrated in FIGS. 2 and 3, a transverse pin 38 may be provided for partial obstruction of the bore 33 in the immediate vicinity of the transverse ports 34. A hydraulic servomotor 39 is employed to displace the pin. The pin has the function of controlling the flow cross section and hence the mixing pressure. Once mixing has commenced, the pin may be withdrawn to a greater or lesser extent.

The improvement described and illustrated is believed to admit of many modifications within the ability of persons skilled in the art, all such modifications being considered within the spirit and scope of the invention except as limited by the appended claims.

We claim:

1. An apparatus for charging a mold cavity with a mixture of at least two flowable components, comprising housing means forming a mixing chamber opening into said cavity at one end and provided with at least one pair of inlet ports communicating with said chamber and spaced from said end; and a control slide shiftable along said chamber for simultaneously regulating the flow of said components from said inlet ports into said chamber and out of said chamber into said cavity, said control slide having a first position wherein flow of said components from said chamber into said cavity is blocked and a second position in which flow of said components into said chamber and a mixture of the components into said cavity is permitted;

wherein said control slide defines with said housing means respective recirculation channels communicating with said inlet ports in said first position of said control slide, said apparatus further comprising respective pumps communicating with said inlet ports for delivering said components thereto and having intake sides connected with the respective recirculation channels in said first position of said slide.

2. The apparatus defined in claim 1 wherein said control slide is received within said chamber.

3. The apparatus defined in claim 2 wherein said control slide is formed at least at its extremity turned toward said end of said mixing chamber with a cross section corresponding to the cross section of said chamber and an end face adapted to lie flush with a wall of said mold cavity in said first position.

4. The apparatus defined in claim 3 wherein said control slide is formed with a central bore, further comprising a plunger slidably received in said bore and displaceable independently from said slide.

5. The apparatus defined in claim 4 wherein said slide is formed with respective transverse inwardly divergent frustoconical intermediate ports registering with said inlet ports respectively in said second position of said slide, each of said inlet ports being formed with a respective atomizing nozzle for directing the respective component into said mixing chamber and said bore through said ports.

6. The apparatus defined in claim 5 wherein said atomizing nozzles are each provided with means for imparting rotation to the component as it is introduced into said chamber, the sense of rotation being the same for both said components.

7. The apparatus defined in claim 6 wherein each of said atomizing nozzles includes a sleeve and a central body received within the sleeve and defining an annular clearance therewith, said sleeves having a conically convergent outlet and said central body having a conically convergent tip cooperating with the outlet to form a conically convergent gap communicating with the respective inlet port.

8. The apparatus defined in claim 7 wherein said sleeves are shiftable in said housing means, further comprising means for controlledly biasing said sleeves against juxtaposed faces of said slide.

9. The apparatus defined in claim 1, further comprising a transverse pin extending adjustably into said chamber between said inlet ports and said cavity for controlling the pressure of said mixture.

* * * * *